(12) United States Patent
Iijima et al.

(10) Patent No.: US 8,609,239 B2
(45) Date of Patent: Dec. 17, 2013

(54) RELEASE FILM, CERAMIC PART SHEET AND PROCESS FOR THEIR PRODUCTION, AND PROCESS FOR PRODUCTION OF CERAMIC PART

(75) Inventors: Tadayoshi Iijima, Tokyo (JP); Shuji Iida, Tokyo (JP)

(73) Assignee: TDK Corporation, Tokyo (JP)

( * ) Notice: Subject to any disclaimer, the term of this patent is extended or adjusted under 35 U.S.C. 154(b) by 951 days.

(21) Appl. No.: 12/566,176

(22) Filed: Sep. 24, 2009

(65) Prior Publication Data
US 2010/0080986 A1    Apr. 1, 2010

(30) Foreign Application Priority Data

Sep. 30, 2008  (JP) ................ P2008-254307
Jun. 26, 2009  (JP) ................ P2009-152457

(51) Int. Cl.
B32B 27/00    (2006.01)

(52) U.S. Cl.
USPC ............................. 428/336; 428/447

(58) Field of Classification Search
USPC ........................................ 428/336, 447
See application file for complete search history.

(56) References Cited

U.S. PATENT DOCUMENTS

| | | | |
|---|---|---|---|
| 2006/0134400 A1 | 6/2006 | Takada et al. | 428/313.9 |
| 2007/0116929 A1 | 5/2007 | Fujimori et al. | 428/156 |
| 2008/0038540 A1 | 2/2008 | Hirayama et al. | |
| 2011/0200744 A1 | 8/2011 | Hirayama et al. | |

FOREIGN PATENT DOCUMENTS

| | | |
|---|---|---|
| JP | H5-169595 | 7/1993 |
| JP | H5-269931 | 10/1993 |
| JP | H6-171026 | 6/1994 |
| JP | H7-088088 | 9/1995 |
| JP | H11-021797 | 1/1999 |
| JP | 11-152459 | 6/1999 |
| JP | 2001-315261 | 11/2001 |
| JP | 2004-188811 | 7/2004 |
| JP | 2005-186516 | 7/2005 |
| JP | 3870785 | 10/2006 |
| JP | 2007-46031 | 2/2007 |
| JP | 2007-069360 | 3/2007 |
| TW | 200808935 A | 2/2008 |
| WO | WO 93/11933 | 6/1993 |

*Primary Examiner* — D. S. Nakarani (74) *Attorney, Agent, or Firm* — Drinker Biddle & Reath LLP (57) ABSTRACT

A release film 10 having a base film 12 and a polymer layer 14 formed on one side of the base film 12, wherein the polymer layer 14 includes a layer containing a cured (meth)acrylate component and a film containing a silicone polymer component covering part of the surface on the side of the layer opposite the base film side, and wherein the silicone polymer component is a modified silicone oil polymer that has been modified with a (meth)acryloyl and/or vinyl group.

8 Claims, 3 Drawing Sheets

RELEASE FILM, CERAMIC PART SHEET AND PROCESS FOR THEIR PRODUCTION, AND PROCESS FOR PRODUCTION OF CERAMIC PART

BACKGROUND OF THE INVENTION

1. Field of the Invention

The present invention relates to a release film, a ceramic part sheet and a process for their production, and to a process for production of a ceramic part.

2. Related Background Art

The known production processes for laminated ceramic capacitors include processes in which ceramic green sheets formed on release films are laminated (for example, Japanese Patent No. 3870785). The recent downsizing of laminated ceramic capacitors has led to further decreasing thicknesses of dielectric layers. At the same time, the release films used to form dielectric layers must have surfaces with satisfactorily reduced irregularities, and also satisfactory release properties.

Release films have been proposed that have laminated structures comprising flattening layers and silicone resin-formed release layers successively laminated on a filler-containing base film. Such a laminated structure maintains sufficient mechanical strength while also exhibiting both satisfactory smoothness and release properties due to low surface irregularities.

SUMMARY OF THE INVENTION

For the release films described above, it is necessary to provide at least two layers, a flattening layer and a release layer, on the base film. It is naturally desired to simplify the production process with a single-layer structure in which the flattening layer and release layer are integrated.

When a release layer alone is formed on a base film without forming a flattening layer, it is necessary to increase the thickness above that of a conventional release layer in order to adequately reduce the irregularities on the surface (release surface). However, a release layer is usually formed of a thermosetting silicone resin to allow satisfactory release properties to be exhibited, and problems have been encountered when increasing the thickness of the release layer because the interior of the release layer cannot be easily hardened and irregularities tend to be formed on the release layer surface.

When a photocuring (ultraviolet ray curing) silicone resin is used for the release layer, on the other hand, coating the release surface with a paste containing a dielectric material component or electrode component tends to result in problems such as repelling of the paste and poor coatability.

It has been attempted to decrease the amount of filler in the base film as a strategy for reducing irregularities on the release layer surface. However, this has undesirably reduced the mechanical strength of the base film, i.e. the release film.

It is an object of the present invention, which has been accomplished in light of these circumstances, to provide a release film having a release surface with excellent release properties and coatability, which is easily produced, as well as a process for production of the release film. It is another object of the invention to provide a ceramic part sheet which employs such a release film to allow formation of a green sheet with sufficiently reduced pinholes and thickness variation and which is suitable for production of laminated ceramic products, as well as a process for its production. It is yet another object of the invention to provide a process for production of a ceramic part which employs the aforementioned ceramic part sheet to satisfactorily increase yields for production of ceramic parts.

In order to achieve these objects, the invention provides a release film comprising a base film and a polymer layer formed on one side of the base film, wherein the polymer layer comprises a layer containing a cured (meth)acrylate component and a film containing a silicone polymer component covering part of the surface on the side of the layer opposite the base film side, and wherein the silicone polymer component is a modified silicone oil polymer that has been modified with a (meth)acryloyl and/or vinyl group.

The release film comprises a polymer layer containing a cured (meth)acrylate component. The polymer layer comprises a film containing a silicone polymer component on part of the surface opposite the base film side. The surface of the polymer layer on the side with the silicone polymer component-containing film is a release surface on which a ceramic green sheet or electrode green sheet has been formed, and the release surface has excellent release properties since it comprises a silicone polymer component-containing film on a portion thereof as mentioned above. In addition, since the cured (meth)acrylate component is also exposed on the release surface, when the paste containing the dielectric material or electrode material is applied it is not easily repelled and exhibits excellent coatability.

Such release films do not require separate formation of a release layer and flattening layer on the base film, as the polymer layer alone is sufficient, and therefore the production steps are simplified for more convenient production.

The release film of the invention preferably has a water contact angle of 82-104° on the surface of the film-bearing polymer layer. This will result in a release film with even more excellent release properties.

The release film of the invention preferably satisfies the following formula (1), where b (mass %) is the content of the silicone polymer component in the polymer layer, d (g/cm$^3$) is the density of the polymer layer and t (μm) is the thickness of the polymer layer. This will result in an even higher level of both the release properties and coatability of the release surface.

$$0.2 \leq 10 \times b \times t \times d \leq 6 \tag{1}$$

The release film of the invention preferably has a polymer layer thickness t (μm) of 0.5-3 μm. This will more adequately reduce irregularities on the release surface.

The release film of the invention preferably has a polymer layer thickness "t" which is greater than the maximum peak height on the surface of the base film in contact with the polymer layer. This will more adequately reduce irregularities on the release surface.

According to the invention there is provided a ceramic part sheet comprising the release film described above and a green sheet composed of a ceramic green sheet and/or an electrode green sheet on the polymer layer of the release film.

Since the ceramic part sheet has a release film with sufficiently reduced irregularities and excellent release properties, it is possible to adequate reduce pinholes or thickness variation in the ceramic green sheet or electrode green sheet. As a result, yields of ceramic products such as laminated ceramic capacitors can be satisfactorily improved.

According to the invention there is further provided a process for production of a release film comprising a base film and a polymer layer on the base film, the process for production of a release film comprising a coating solution preparation step in which a coating solution is prepared containing a photopolymerization initiator, an organic solvent, and a (meth)acrylate component and a modified silicone oil that has been modified with a (meth)acryloyl and/or vinyl group, which are mutually immiscible, and a polymer layer-forming step in which the coating solution is applied onto the base film and dried, and the (meth)acrylate component and modified silicone oil are polymerized by photoirradiation to form a polymer layer on the base film.

According to this production process, a coating solution is prepared using a (meth)acrylate component and a modified silicone oil that has been modified by a (meth)acryloyl and/or vinyl group, which are mutually immiscible and are polymerized to form a polymer layer. It is thus possible to form a polymer layer wherein a portion of the surface of the layer containing the (meth)acrylate component polymer is covered by the modified silicone oil polymer. This can produce a polymer layer with excellent ceramic green sheet release properties and coatability for dielectric material paste. In addition, since it is not necessary to separately form the flattening layer and release layer as in the prior art, the release film can be produced more easily.

Also according to the invention there is further provided a process for production of a ceramic part sheet comprising a base film and a ceramic green sheet and/or electrode green sheet on the polymer layer of a release film with a polymer layer on the base film, the process for production of a ceramic part sheet comprising a coating solution preparation step in which a coating solution is prepared containing a photopolymerization initiator, an organic solvent, and a (meth)acrylate component and a modified silicone oil that has been modified with a (meth)acryloyl and/or vinyl group, which are mutually immiscible, a polymer layer-forming step in which the coating solution is applied onto the base film and dried and the (meth)acrylate component and modified silicone oil are polymerized by photoirradiation to form a polymer layer on the base film, and a sheet-forming step in which a paste containing a ceramic powder and/or a paste containing an electrode material are each applied onto the polymer layer and dried to form a ceramic green sheet and/or electrode green sheet on the release film.

According to this process for production of a ceramic part sheet, irregularities are satisfactorily reduced and, since a release film with excellent release properties and coatability is used, formation of ceramic green sheets and electrode green sheets is facilitated while generation of pinholes in green sheets and variation in the thickness of green sheets are sufficiently inhibited. As a result, yields of ceramic products such as laminated ceramic capacitors can be satisfactorily improved. Production cost can also be reduced since the production process is simplified.

In the process for production of a ceramic part sheet according to the invention, the (meth)acrylate component preferably contains an alkane(diol) di(meth)acrylate monomer and the paste preferably contains a butyral-based resin. A butyral-based resin can adequately increase the mechanical strength for green sheets. Since the butyral-based resin has a hydrophilic structure due to hydroxyl groups of the polyvinyl alcohol while the alkane(diol) di(meth)acrylate monomer is hydrophobic, the release properties of green sheets can be further enhanced.

According to the invention there is also provided a process for production of a sintered compact-containing ceramic part, which comprises a preparation step in which a plurality of the aforementioned ceramic part sheets are prepared, a lamination step in which the green sheets of the ceramic part sheets are laminated to obtain a laminated body with multiple green sheets, and a firing step in which the laminated body is fired to obtain a sintered compact.

Because the process for production of a ceramic part employs a ceramic part sheet with a release film having such characteristics, it is possible to produce ceramic parts at high yield.

According to the invention it is possible to provide a release film having a release surface with excellent release properties and coatability, which is easily produced, as well as a process for production of the release film. It is also possible to provide a ceramic part sheet which employs such a release film to allow formation of a green sheet with sufficiently reduced pinholes and thickness variation and which is suitable for production of laminated ceramic products, as well as a process for its production. In addition, it is possible to provide a process for production of a ceramic part which employs the aforementioned ceramic part sheet, to adequately minimize occurrence of defective products and satisfactorily increase yields for production of ceramic parts.

DESCRIPTION OF THE PREFERRED EMBODIMENTS

Preferred embodiments of the invention will now be explained with reference to the accompanying drawings where necessary. For the drawings, identical or corresponding elements will be referred to by like reference numerals and may be explained only once.

Figure 1:
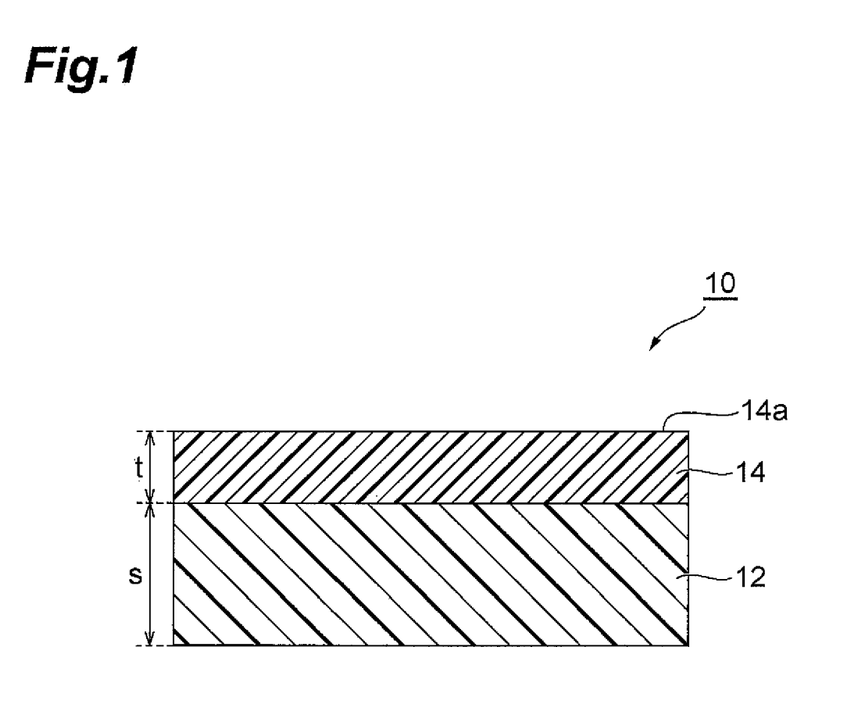
FIG. 1 is a cross-sectional view schematically showing a preferred embodiment of a release film according to the invention.

FIG. 1 is a cross-sectional view schematically showing a preferred embodiment of a release film according to the invention. The release film 10 comprises a base film 12 and a polymer layer 14 formed on one side of the base film 12.

The polymer layer 14 contains a (meth)acrylate polymer component and a silicone polymer component, and part of the surface of the (meth)acrylate polymer component-containing layer is covered by the silicone polymer component on the surface 14a of the side of the polymer layer 14 opposite the base film 12 side. Throughout the present specification, "(meth)acrylate" refers to acrylate and its corresponding methacrylate, and "(meth)acryloyl" refers to acryloyl and its corresponding methacryloyl.

A (meth)acrylate polymer component is a component composed of a (meth)acrylate monomer and/or (meth)acrylate oligomer polymer (cured product), and it can be obtained by polymerization of a (meth)acrylate monomer and/or acrylate oligomer. As preferred examples of (meth)acrylate monomers there may be mentioned nonanediol di(meth)acrylate, decanediol di(meth)acrylate, butylpropanediol di(meth)acrylate and trimethylolpropane di(meth)acrylate.

A silicone polymer component is a component composed of a modified silicone oil modified with a (meth)acryloyl and/or vinyl group, and it can be obtained by polymerization of the modified silicone oil. As preferred examples of modified silicone oils there may be mentioned single-terminal (meth)acrylate-modified silicone oils, double-terminal (meth)acrylate-modified silicone oils, side-chain (meth)acrylate-modified silicone oils, double-terminal side-chain (meth)acrylate-modified silicone oils, single-terminal vinyl-modified silicone oils, double-terminal vinyl-modified silicone oils, side-chain vinyl-modified silicone oils and double-terminal side-chain vinyl-modified silicone oils. If necessary, several of these modified silicone oils may be selected for use as a blend.

For formation of the polymer layer 14, the (meth)acryloyl and/or vinyl group of the modified silicone oil react with the (meth)acrylate component, causing the modified silicone oil to be fixed as a (meth)acrylate polymer to form a silicone polymer component-containing film. Some of the (meth)acryloyl and/or vinyl groups of the modified silicone oil may also react together during the reaction. It is possible to reduce to a minimum the amount of unreacted silicone oil in the release film of this embodiment, so that repelling of the coated dielectric material paste can be sufficiently reduced. On the other hand, using a non-reactive silicone oil tends to result in repelling of the coated dielectric material paste. This is believed to be because the non-reactive silicone oil is not immobilized in the polymer layer, and therefore the silicone oil migrates on the surface during storage and, upon winding the film into a roll, may be transferred onto the side lacking the release layer, resulting in a polymer layer having a surface which is non-uniform on the macroscopic level.

The thickness t ($\mu$m) of the polymer layer 14 is preferably 0.5-3 $\mu$m, more preferably 1-2 $\mu$m and even more preferably 1-1.5 $\mu$m. A thickness t ($\mu$m) of less than 0.5 $\mu$m will impair the smoothness of the surface 14a of the release film 10, tending to result in pinholes and thickness variations when the green sheet is formed on the surface 14a. On the other hand, a thickness t ($\mu$m) of greater than 3 $\mu$m will tend to result in curling of the release film 10 when the base film is thin.

The content of the (meth)acrylate polymer component and silicone polymer component in the polymer layer 14 is preferably 0.001-10 parts by mass, more preferably 0.01-2 parts by mass and even more preferably 0.1-0.2 part by mass for the silicone polymer component with respect to 100 parts by mass of the (meth)acrylate polymer component. If the silicone polymer component content is less than 0.001 part by mass with respect to 100 parts by mass of the (meth)acrylate polymer component, the excellent release properties of the surface 14a of the polymer layer 14 will tend to be impaired. On the other hand, if the silicone polymer component content is greater than 10 parts by mass with respect to 100 parts by mass of the (meth)acrylate polymer component, application of ceramic paste or electrode paste onto the surface (release surface) 14a of the polymer layer 14 will tend to cause repelling of the paste and interfere with uniform thickness application.

The density d (g/cm$^3$) of the polymer layer 14 is preferably 0.95-1.25 g/cm$^3$, more preferably 1.0-1.2 g/cm$^3$ and even more preferably 1.05-1.15 g/cm$^3$. A polymer layer 14 having such density will allow curling to be satisfactorily inhibited.

The amount of silicone polymer component per unit area (mg/m$^2$) in the polymer layer 14 which is formed on the surface of the base film 12 can be calculated as 10×b×t×d. The amount of silicone polymer component calculated by this formula is preferably 0.2-6 mg/m$^2$, more preferably 0.2-4 mg/m$^2$, even more preferably 0.2-3 mg/m$^2$ and most preferably 0.2-2 mg/m$^2$. An excess amount of silicone polymer component will tend to impair the excellent coatability when a dielectric material paste is applied. A lower amount of silicone polymer component, on the other hand, will tend to impair the excellent release properties.

The polymer layer 14 may also contain inorganic particles such as silica in addition to the (meth)acrylate polymer component and silicone polymer component.

One surface 14a of the polymer layer 14 preferably has adequately reduced irregularities, i.e. it is preferably smooth. When a ceramic green sheet or electrode green sheet is formed on the surface 14a, this will satisfactorily inhibit generation of pinholes in the green sheet and help to sufficiently reduce thickness variation.

The maximum peak height (SRp) of the surface 14a of the polymer layer 14 is preferably no greater than 0.2 $\mu$m, more preferably no greater than 0.1 $\mu$m and even more preferably no greater than 0.05 $\mu$m. The maximum peak height can be adjusted, for example, by varying the thickness t of the polymer layer 14 when the polymer layer 14 is formed. The maximum peak height (SRp) can be measured according to JIS B0601, using a Micromap System (optical interference three-dimensional non-contact surface profile measurement system) by Ryoka Systems, Inc.

The polymer layer 14 comprises, on the surface 14a, a film containing a silicone polymer component covering part of the layer containing the cured (meth)acrylate polymer component. The proportion of the area which is covered by the film and the area which is not covered can be controlled by adjusting the amount of silicone oil addition with respect to the (meth)acrylate component during formation of the polymer layer 14. The (meth)acrylate polymer component is exposed on part of the surface 14a. If the proportion of silicone oil used with respect to the (meth)acrylate component during formation of the polymer layer 14 is reduced, the amount of (meth)acrylate polymer component exposed on the surface 14a will be greater. On the other hand, if the proportion of silicone oil used with respect to the (meth)acrylate component is increased, the amount of (meth)acrylate polymer component exposed on the surface 14a will be less. This will allow excellent release properties and coatability to be obtained for the release film 10.

The base film 12 is composed of a synthetic resin. As synthetic resins there may be mentioned polyester resins, polyolefin resins such as polypropylene or polyethylene resins, polylactic acid resins, polycarbonate resins, acrylic-based resins such as polymethyl methacrylate resins or polystyrene resins, polyamide resins such as nylon, polyvinyl chloride resins, polyurethane resins, fluorine-based resins, polyphenylene sulfide resins and the like. Polyester resins are preferred among these, and polyethylene terephthalate (PET) is more preferred from the viewpoint of mechanical properties, transparency and cost.

The thickness "s" of the base film 12 is preferably 10-100 $\mu$m and more preferably 20-50 $\mu$m. A thickness s ($\mu$m) of less than 10 $\mu$m will tend to impair the physical properties such as dimensional stability of the release film 10, while a thickness of greater than 100 $\mu$m will tend to increase the production cost per unit area of the release film.

From the viewpoint of sufficiently increasing the mechanical strength of the release film 10, the base film 12 preferably contains a filler to an extent that does not impair the transparency. The filler is not particularly restricted, and there may be used calcium carbonate, calcium phosphate, silica, kaolin, talc, titanium oxide, fumed silica, alumina or organic particles, for example.

A process for production of the release film 10 of this embodiment will now be explained.

The process for production of the release film 10 of this embodiment comprises a coating solution preparation step in which a coating solution is prepared containing a photopolymerization initiator, an organic solvent, and a (meth)acrylate component and a modified silicone oil that has been modified with a (meth)acryloyl and/or vinyl group, which are mutually immiscible, a precursor layer-forming step in which the coating solution is applied onto the base film 12 and dried to form a precursor layer, and a polymer layer-forming step in which the (meth)acrylate component and modified silicone oil in the precursor layer are polymerized (cured) by irradiation of light on the precursor layer, to form a polymer layer 14 on the base film 12. Each of these steps will now be explained in detail.

In the coating solution preparation step, first a (meth)acrylate component and a modified silicone oil, which are mutually immiscible, are prepared. Here, "mutually immiscible" means that the components undergo phase separation or produce opacity when mixed, failing to form a homogeneous solution.

The (meth)acrylate component is a (meth)acrylate monomer and/or (meth)acrylate oligomer, and A-NOD-N and A-DOD (trade names of Shin-Nakamura Chemical Co., Ltd.) may be mentioned as preferred examples. As preferred examples of modified silicone oils there may be mentioned X-22-164A, X-22-164B, X-22-164C, X-22-164E, X-22-174DX and X-22-2426 (all trade names of Shin-Etsu Chemical Co., Ltd.). Using such oils can further reduce irregularities on the release surface 14a to obtain a release film 10 with superior smoothness.

As (meth)acrylate monomers there are preferred compounds represented by the following general formula (2). The modified silicone oil is a silicone oil modified with a (meth)acryloyl and/or vinyl group, and it is preferably one represented by general formula (3) or (4) below.

(2)

In general formula (2), n represents an integer of 5-20.

(3)

In general formula (3), $R_3$ and $R_4$ each represent a single bond or divalent hydrocarbon group, and m represents an integer of 1 or greater. $R_3$ and $R_4$ are preferably approximately C1-10 polymethylene groups or C1-10 alkylene groups. Also, m is preferably about 10-1000.

(4)

In general formula (4), $R_5$ and $R_6$ each represent a single bond or divalent hydrocarbon group, and k represents an integer of 1 or greater. $R_5$ and $R_6$ are preferably approximately C1-10 polymethylene groups or C1-10 alkylene groups. Also, k is preferably about 10-1000.

A radical photopolymerization initiator may be used as the photopolymerization initiator. When ultraviolet rays are used, it is preferred to use α-hydroxyalkylphenone or α-aminoalkylphenone, for example. The commercially available products IRGACURE184, IRGACURE127, IRGACURE907, IRGACURE379 and DAROCURE1173 (all trade names of Ciba Specialty Chemicals Co., Ltd.) may be used.

As the organic solvent there may be used any solvent that can dissolve both the (meth)acrylate component and modified silicone oil. This will yield a coating solution for formation of the polymer layer 14, wherein the (meth)acrylate polymer component and silicone polymer component are uniformly dissolved. A non-uniform coating solution will tend to result in non-homogeneity of the surface characteristics at different locations. Toluene, xylene and methyl ethyl ketone may be mentioned as organic solvents.

For example, 150 parts by mass of the organic solvent may be combined with 50-150 parts by mass of the (meth)acrylate component, 0.005-10 parts by mass of the modified silicone oil and 1-10 parts by mass of the photopolymerization initiator, and the mixture stirred to prepare the coating solution.

An excessive amount of modified silicone oil with respect to the (meth)acrylate component will tend to result in residue of unreacted components in the polymer layer 14, thus preventing sufficient coatability for the dielectric material paste. If the amount of modified silicone oil is too small with respect to the (meth)acrylate component, on the other hand, the excellent release properties will tend to be impaired.

In the precursor-forming step, a bar coater is used to apply the coating solution prepared as described above onto one surface of the base film 12. It is then dried in a drier at, for example, a temperature of 50-150° C. for 10 seconds to 10 minutes, to remove the organic solvent by evaporation and form a precursor layer on one surface of the base film 12.

The method of applying the coating solution is not particularly restricted, and may be reverse coating, gravure coating, rod coating, bar coating, Meyer bar coating, die coating, spray coating or the like.

The specific gravity of the (meth)acrylate component in the coating solution will usually be about 0.95-1.5, and the specific gravity of the silicone oil will usually be about 0.95-1.5. That is, the specific gravities of the (meth)acrylate component and modified silicone oil are approximately the same, or that of the modified silicone oil may be slightly lighter. Also, the modified silicone oil has lower surface energy than the (meth)acrylate component. A coating solution containing different incompatible components will experience migration of the components toward a lower energy state. In the release solution of this embodiment, the specific gravity of the modified silicone oil is lighter and its surface energy is also lower, as mentioned above. Consequently, after the release solution has been applied onto one surface of the base film 12 in the precursor-forming step and the solvent has been dried off, the immiscibility of the (meth)acrylate component and modified silicone component causes the silicone oil to migrate more easily toward the surface opposite the base film 12 side (i.e. toward the release surface 14a side).

Normally, the modified silicone oil will tend to dissolve the photopolymerization initiator less easily than the (meth)acrylate component. Ultraviolet irradiation of the release solution from which the solvent has been removed generates radicals due to the reaction initiator, resulting in radicalization of the (meth)acrylate component and radical polymerization of the (meth)acrylate component. The (meth)acryloyl and/or vinyl groups of the silicone oil also undergo radical polymerization.

In the polymer-forming step, light or an electron beam is irradiated onto the precursor layer formed on one surface of the base film 12, thus forming a polymer layer. Ultraviolet rays are preferably used as the light. The light source for the ultraviolet rays may be a commercially available mercury lamp or metal halide lamp, and the ultraviolet ray exposure dose is adjusted according to the thickness of the precursor layer. This will allow sufficient curing of the precursor layer. In order to prevent oxygen inhibition during radical polymerization, the ultraviolet irradiation is preferably carried out in a nitrogen atmosphere.

Irradiation with ultraviolet rays produces radical polymerization of the (meth)acrylate component and modified silicone oil in the precursor layer. Polymerization of the (meth)acrylate component produces a (meth)acrylate polymer component, while the modified silicone oil is converted to a silicone polymer component. In some cases, the reactive groups of the modified silicone oil ((meth)acryloyl and/or vinyl groups) may react with the reactive groups of the (meth)acrylate monomer ((meth)acryloyl groups). As the polymerization reaction proceeds, the precursor layer is converted to a polymer layer 14.

The release properties of the release film can be adjusted by the type of (meth)acrylate component, the molecular mass of the modified silicone oil and the type of reactive groups therein, and the method of modification (double-terminal, single-terminal, side-chain combination). The release properties of the silicone polymer component-containing film on the surface of the (meth)acrylate polymer component-containing layer can be adjusted by changing the proportion of the layer surface that is covered (the coverage factor). Generally speaking, a higher coverage factor by the silicone polymer component will result in lighter release, while a lower coverage factor will result in heavier release.

The coverage factor according to the invention can be determined by measuring the purified water contact angle on the surface 14a of the polymer layer 14. The reasons for this are explained below. Since an immiscible (meth)acrylate component and modified silicone oil are used for the invention, drying removal of the organic solvent causes the (meth)acrylate component and modified silicone oil to separate, so that the modified silicone oil covers the (meth)acrylate component layer. A larger amount of silicone oil per unit area will cause the coverage factor by the silicone polymer component in the polymer layer 14 to approach 1 (100%, represented as a percentage).

The relationship for a liquid on a surface is represented by Young's equation. This is represented by the following relational expression, where $\theta$ is the contact angle, $\gamma_1$ is the surface tension of the solid, $\gamma_2$ is the interfacial tension between the liquid and solid and $\gamma_L$ is the surface tension of the liquid.

$$\gamma_1 = \gamma_L \times \cos\theta + \gamma_2$$

Assuming a liquid only on the surface of the (meth)acrylate polymer component, this may be represented by the following relational expression, where $\theta_A$ is the contact angle, $\theta_A$ is the surface tension of the (meth)acrylate polymer component and $\gamma_{AL}$ is the liquid-(meth)acrylate polymer interfacial tension.

$$\gamma_A = \gamma_L \times \cos\theta_A + \gamma_{AL} \qquad (i)$$

Next, assuming the liquid on the surface completely covered by the silicone polymer component, it may be represented by the following relational expression (ii), where $\theta_S$ is the contact angle, $\gamma_S$ is the surface tension of the silicone polymer component and $\gamma_{SL}$ is the liquid-silicone polymer component interfacial tension.

$$\gamma_S = \gamma_L \times \cos\theta_S + \gamma_{SL} \qquad (ii)$$

When the liquid is present on the side with a portion of the (meth)acrylate polymer component surface covered with the silicone polymer component (with the (meth)acrylate polymer component being exposed on the sections not covered by the silicone polymer component), this relationship is represented by the following relational expression (iii), where $\theta_X$ is the contact angle, $\gamma_X$ is the surface tension of the polymer component and $\gamma_{XL}$ is the liquid-polymer component surface tension.

$$\gamma_X = \gamma_L \times \cos\theta_X + \gamma_{XL} \qquad (iii)$$

If "a" is the proportion of the area where the (meth)acrylate polymer component is exposed with respect to the entire surface 14a of the polymer layer 14 (the exposure factor) and "s" is the proportion of the area covered with the modified silicone oil (coverage factor) (the area covered by the modified silicone oil per unit area/unit area), then a+s=1. The contribution of $\gamma_A$ and $\gamma_S$ to $\gamma_X$ is proportional to this area ratio. That is, the relationship represented by the following formula (iv) applies.

$$\gamma_X = a \times \gamma_A + s \times \gamma_S \qquad (iv)$$

The relationship represented by the following formula (v) similarly applies for $\gamma_{XL}$.

$$\gamma_{XL} = a \times \gamma_{AL} + s \times \gamma_{SL} \qquad (v)$$

The following formula (vi) is derived from formulas (i), (ii), (iii), (iv) and (v).

$$\cos\theta_X = a \times \cos\theta_A + s \times \cos\theta_S = (1-s) \times \cos\theta_A + s \times \cos\theta_S \qquad (vi)$$

The coverage factor s by the silicone polymer component can be determined from $\theta_A$, $\theta_S$ and $\theta_X$ based on this formula (vi). If the coverage factor for a reference variable is known, then the coverage factor for any silicone polymer component can be calculated. For a particularly large amount of silicone polymer component, the coverage factor can be 1 (100%, represented as a percentage), due to error for the measured value of the contact angle. In such cases, the coverage factor can be determined as follows. For example, assuming 1 mg of silicone polymer component present per 1 m$^2$, the coverage factor by the silicone polymer component is represented as $s_0$ and the exposure factor for the (meth)acrylate polymer is represented as $a_0$ ($a_0 + s_0 = 1$).

The coverage factor for coverage with the silicone polymer component at an arbitrary dose n (mg) per 1 m$^2$ is represented by $s_n$, and the exposure factor for the (meth)acrylate polymer component is represented as $a_n$ ($a_n + s_n = 1$).

Thus, $a_n = a_0^n = (1-s_0)^n$, and:

$$s_n = 1 - a_n = 1 - (1-s_0)^n.$$

Representing the contact angle for n (mg) as $\theta_N$:

$$\cos\theta_N = (1-s_0)^n \times \cos\theta_A + \{1-(1-s_0)^n\} \times \cos\theta_S,$$

thus allowing $s_0$ to be calculated. The value of n can be determined by n=10×b×t×d, where d (g/cm$^3$) is the density of the (meth)acrylate polymer component, t (μm) is the thickness, and b (mass %) is the proportion of modified silicone oil in the polymer layer.

The coverage factor by the silicone polymer component is preferably 0.33-0.99999 (33%-99.999%, represented as a percentage) and more preferably 0.55-0.98 (55-98%, represented as a percentage).

In the process for production of the release film 10 according to this embodiment, it is not necessary to separately form the release layer and flattening layer, and one type of release solution can be used to form only a single polymer layer on the base film to obtain the release film 10. This production process can sufficiently reduce irregularities on the release surface 14a while allowing easy production of the release film 10 exhibiting sufficiently excellent release properties and coatability.

Figure 2:
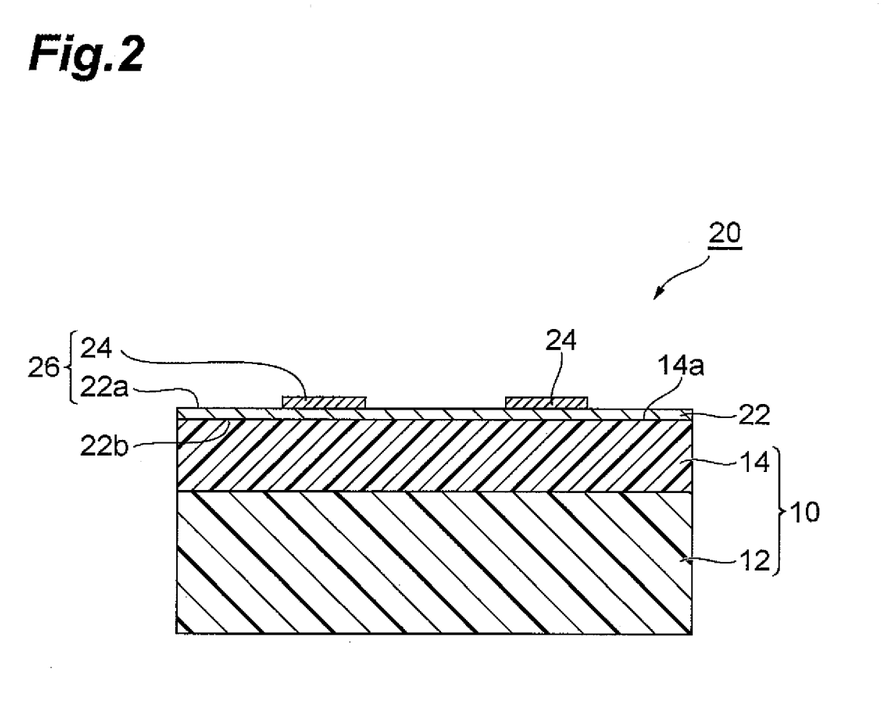
FIG. 2 is a cross-sectional view schematically showing a preferred embodiment of a ceramic part sheet of the invention.

FIG. 2 is a cross-sectional view schematically showing a preferred embodiment of a ceramic part sheet of the invention. The ceramic part sheet 20 (ceramic sheet 20) comprises a release film 10, a ceramic green sheet 22 on the release surface 14a of a polymer layer 14, and an electrode green sheet 24 formed on the ceramic green sheet 22.

The ceramic green sheet 22 may be, for example, a dielectric material green sheet for formation of a laminated ceramic capacitor. The thickness of the ceramic green sheet 22 may be, for example, from several μm to several hundred μm. The ceramic green sheet 22 is released from the release film 10 and then fired to obtain a dielectric material containing, for example, calcium titanate, strontium titanate and/or barium titanate.

The thickness of the electrode green sheet 24 may be, for example, from several μm to several hundred μm. The electrode green sheet 24 is released from the release film 10 and then fired to obtain an electrode containing, for example, copper or a copper alloy, nickel or a nickel alloy, or the like.

The process for production of a ceramic part sheet will now be explained in detail. The process for production of the ceramic part sheet 20 of this embodiment comprises a coating solution preparation step in which a coating solution is prepared containing a photopolymerization initiator, an organic solvent, and a (meth)acrylate monomer and a modified silicone oil that has been modified with a (meth)acryloyl and/or vinyl group, which are mutually immiscible, a precursor layer-forming step in which the prepared coating solution is applied onto the base film 12 and dried to form a precursor layer, a polymer layer-forming step in which the precursor layer is irradiated with light to polymerize the (meth)acrylate monomer and modified silicone oil in the precursor layer, to form a polymer layer 14 on the base film to obtain a release film 10, and a sheet-forming step in which a ceramic paste containing a ceramic powder is applied onto the release surface 14a of the polymer layer 14 of the obtained release film 10 and dried to form a ceramic green sheet 22, an electrode paste containing an electrode material is applied thereover and dried, to form an electrode green sheet 24 on the ceramic green sheet 22, thereby obtaining a ceramic part sheet with the ceramic green sheet 22 and electrode green sheet 24 laminated in that order on the release film 10. The process for producing the release film 10 from the coating solution preparation step to the polymer layer-forming step has already been explained, and therefore only the sheet-forming step will be described in detail below.

In the sheet-forming step, a ceramic powder-containing paste (ceramic paste) and an electrode material-containing paste (electrode paste) are each applied onto the surface 14a of the release film 10 obtained in the polymer layer-forming step, on the side opposite the base film 12 side.

The ceramic paste may be prepared, for example, by kneading a dielectric starting material (ceramic powder) and an organic vehicle. The dielectric starting material may be appropriately selected from among compounds that form complex oxides or oxides upon firing, such as carbonates, nitrites, hydroxides and organometallic compounds. The dielectric starting material may be a powder with a mean particle size of no greater than 0.4 μm and preferably about 0.1-3.0 μm.

The electrode paste may be prepared by kneading an organic vehicle with an electric conductor material composed of a conductive metal or alloy, an oxide that forms an electric conductor material upon firing, an organometallic compound, or a resinate.

The electric conductor material used for production of the electrode paste is preferably Ni metal, a Ni alloy or a mixture thereof. For improved adhesion, the electrode paste may also contain a plasticizer. As plasticizers there may be mentioned phthalic acid esters such as benzylbutyl phthalate (BBP), adipic acid, phosphoric acid esters, glycols and the like.

The organic vehicle in the ceramic paste and electrode paste is prepared by dissolving a binder resin in an organic solvent. The binder resin used in the organic vehicle may be, for example, ethylcellulose, an acrylic resin, a butyral-based resin, polyvinylacetal, polyvinyl alcohol, a polyolefin, polyurethane, polystyrene, or a copolymer of the foregoing. Butyral-based resins, and specifically polyvinyl butyral-based resins, are preferred among these. Using a butyral-based resin can increase the mechanical strength of the ceramic green sheet 22 and electrode green sheet 24. This can further enhance the release properties of the ceramic green sheet 22 and electrode green sheet 24, if an alkane(diol) di(meth)acrylate monomer is used as the starting material for the polymer layer 14.

The polymerization degree of the polyvinyl butyral-based resin is preferably 1000-1700 and more preferably 1400-1700.

The organic solvent used for the organic vehicle may be, for example, a single organic solvent such as terpineol, alcohol, butylcarbitol, acetone, toluene, xylene or benzyl acetate, or a mixture of two or more thereof. As alcohols there may be mentioned methanol, ethanol, propanol, butanol and the like.

The ceramic paste may also contain additives selected from among dispersing agents, plasticizers, charge removers, dielectric materials, glass frits and insulators, as necessary.

The ceramic paste is coated onto the surface 14a of the release film 10 using a doctor blade apparatus, for example. The applied ceramic paste is dried in a commercially available drier at a temperature of, for example, 50-100° C. for 1-20 minutes, to form a ceramic green sheet 22. The ceramic green sheet 22 is reduced in volume by 5-25% compared to before drying.

A screen printing device is then used to print the electrode paste into a prescribed pattern on the surface 22a of the formed ceramic green sheet 22. The applied electrode paste is dried in a commercially available drier at a temperature of, for example, 50-100° C. for 1-20 minutes, to form an electrode green sheet 24. This can yield a ceramic part sheet 20 comprising the release film 10, ceramic green sheet 22 and electrode green sheet 24 laminated in that order.

Since the ceramic part sheet 20 is produced using the release film 10 having the polymer layer 14, the release properties of the green sheet 26 composed of the ceramic green sheet 22 and electrode green sheet 24 are satisfactorily excellent, thus allowing residue of the released green sheet 26 to be sufficiently reduced. Variation in the thickness of the green sheet 26 is therefore adequately reduced and generation of pinholes are also satisfactorily inhibited.

Application of the electrode paste or ceramic paste onto the surface 14a of the polymer layer 14 sufficiently minimizes repelling, thus allowing easy formation of a green sheet 26 with low pinholes and thickness variation. This further facilitates production of a laminated ceramic capacitor.

A process for production of a laminated ceramic capacitor as a preferred embodiment of the process for production of a ceramic part according to the invention will now be explained.

The process for production of a laminated ceramic capacitor according to this embodiment comprises a step of preparing a plurality of ceramic part sheets, a lamination step in which the green sheets of the ceramic part sheets are laminated to obtain a laminated body, a firing step in which the laminated body is fired to obtain a sintered compact, and an electrode-forming step in which terminal electrodes are formed in the sintered compact to obtain a laminated ceramic capacitor.

In the preparation step, there are prepared a plurality of ceramic part sheets 20 each produced by the process for production of a ceramic part sheet according to the embodiment described above. In the subsequent lamination step, the green sheets 26 of the ceramic part sheets 20 are laminated to obtain a laminated body in which the plurality of green sheets 26 are laminated.

An example of the lamination step will now be explained in detail. First, the release film 10 of the ceramic part sheet 20 is released to obtain a green sheet 26. The side 22b of the green sheet 26 is placed facing the electrode green sheet 24 of a separate ceramic part sheet 20, and the green sheet 26 and ceramic part sheet 20 are laminated. The release film 10 is then released from the laminated ceramic part sheet 20. This procedure may be repeated for lamination of green sheets 26 to obtain a laminated body. Specifically, the procedure in which the release film 10 is released after laminating the ceramic part sheet 20 on the green sheet 26 in the lamination step, is repeated several times to form a laminated body.

A different example of the lamination step will now be explained. The side 22a of a green sheet 26 is placed facing the side 22b of a separate green sheet 26 from which the release film 10 has been released, and the green sheets 26 are laminated. This procedure may be repeated for successive lamination of green sheets 26 to obtain a laminated body. Specifically, the procedure in which green sheets 26 from which the release films 10 have been released are laminated in the lamination step, is repeated several times to form a laminated body.

There are no particular restrictions on the number of laminations of green sheets in the laminated body, and it may be from several dozen to several hundred, for example. A thick outer green sheet with no electrode layer formed thereon may also be provided on both of the edges orthogonal to the direction of lamination of the laminated body. After the laminated body has been formed, the laminated body may be cut into green chips.

In the firing step, the laminated body (green chips) obtained in the lamination step are fired to obtain a sintered compact. The firing conditions may be 1100-1300° C., in an atmosphere of a mixed gas comprising humidified nitrogen and hydrogen. However, the oxygen partial pressure in the atmosphere during firing is preferably no greater than $10^{-2}$ Pa and more preferably $10^{-2}$-$10^{-8}$ Pa. The laminated body is preferably subjected to binder removal treatment before firing. The binder removal treatment may be carried out under ordinary conditions. For example, it may be carried out at 200-600° C. when a base metal such as Ni or a Ni alloy is used as the electric conductor material of the internal electrode layer (electrode green sheet 24).

After firing, the dielectric layer of the sintered compact may be heat treated for reoxidation. The holding temperature or maximum temperature for heat treatment is preferably 1000-1100° C. The oxygen partial pressure for heat treatment is preferably an oxygen partial pressure that is higher than the reducing atmosphere during firing, and more preferably from $10^{-2}$ Pa to 1 Pa. The sintered compact obtained in this manner is preferably subjected to edge polishing by barrel polishing or sand blasting, for example.

In the electrode-forming step, the terminal electrode paste is baked to form a terminal electrode on the side of the sintered compact, to obtain a laminated ceramic capacitor.

Since the process for production of a ceramic part according to this embodiment employs a ceramic part sheet according to the embodiment described above, generation of pinholes in the obtained ceramic part, i.e. the laminated ceramic capacitor, can be satisfactorily minimized. It is thus possible to form a laminated ceramic capacitor at high yield.

Figure 3:
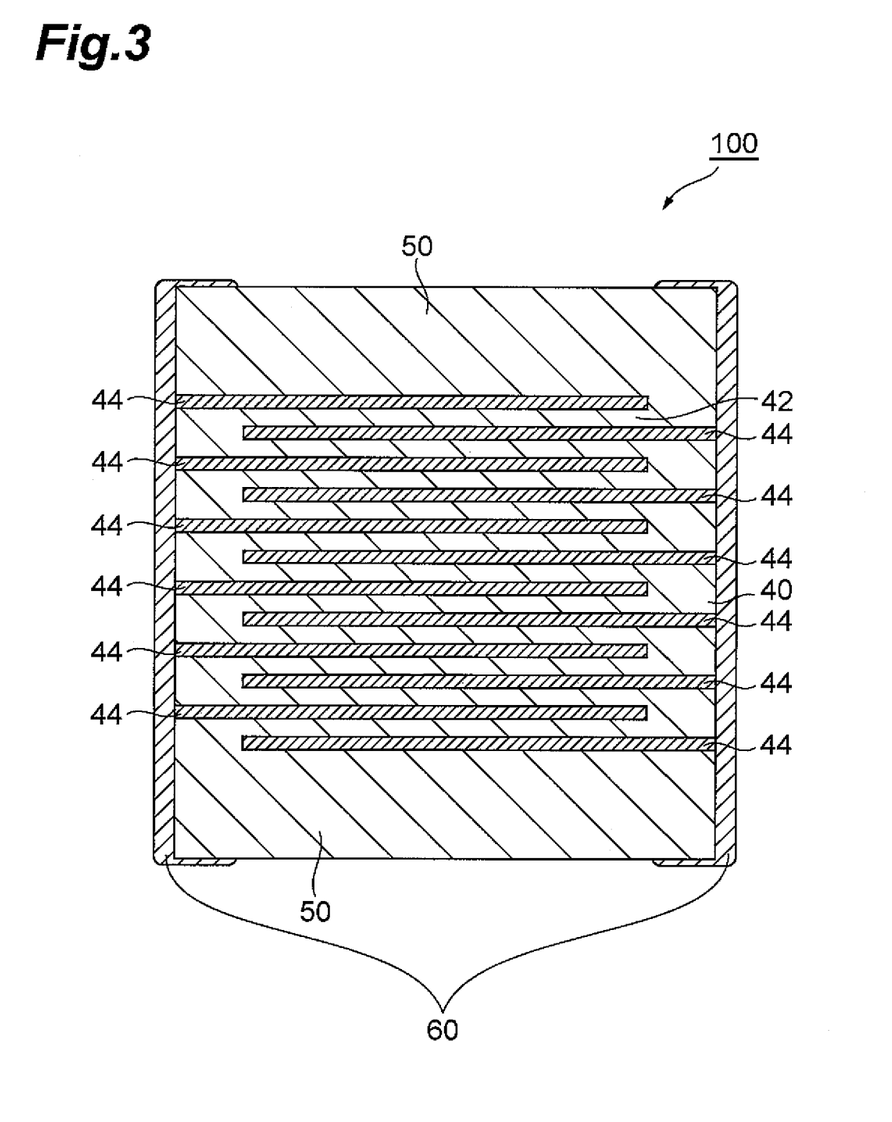
FIG. 3 is a schematic cross-sectional view showing an example of a ceramic part obtained by the process for production of a ceramic part according to the invention.

FIG. 3 is a schematic cross-sectional view showing an example of a ceramic part obtained by the production process of this embodiment. The laminated ceramic capacitor 100 shown in FIG. 3 comprises an inner section 40 and a pair of outer sections 50 sandwiching the inner section 40 in the direction of lamination. The laminated ceramic capacitor 100 of this embodiment has a terminal electrode 60 on the side.

The inner section 40 comprises a plurality of ceramic layers 42 (13 layers for this embodiment) and a plurality of internal electrode layers 44 (12 layers for this embodiment). The ceramic layers 42 and internal electrode layers 44 are alternatingly laminated. The internal electrode layers 44 are electrically connected to the terminal electrode 60.

The outer sections 50 are formed of ceramic layers. The ceramic layers are formed from external green sheets, and contain the same components as the ceramic layers 42, for example.

The embodiment described above is only a preferred embodiment of the invention, and the invention is in no way limited thereto.

EXAMPLES

Example 1

<Preliminary Test>

There were prepared as starting materials an acrylate monomer represented by formula (5) below (specific gravity: 0.99), modified silicone oil modified with acryloyl groups at both ends, represented by formula (6) below (specific gravity: 0.98), and 1-hydroxy-cyclohexyl-phenyl-ketone as a reaction initiator. Upon stirring 100 parts by mass of the acrylate monomer of formula (5) and 5 parts by mass of the modified silicone oil represented by formula (6) in a beaker to prepare a mixture, the mixture became opaque and separated. This confirmed that the acrylate monomer and modified silicone oil were immiscible. Addition of 125 parts by mass of toluene to the mixture rendered it transparent. A release film was then formed in the manner described below.

(5)

(6)

<Formation of Release Film>

After placing 0.0103 part by mass of the modified silicone oil of formula (6) above and 150 parts by mass of toluene with respect to 100 parts by mass of the acrylate monomer of formula (5) above in a metal container, the mixture was stirred to obtain a colorless transparent solution.

The reaction initiator was added to the solution at 2.5 parts by mass to prepare a coating solution. The prepared coating solution was applied onto a biaxially stretched polyethylene terephthalate (PET) film (base film, thickness: 38 μm) using a bar coater and dried for 30 seconds with hot air at a heating temperature of 70° C. for evaporation of the toluene, after which it was irradiated with ultraviolet rays in a nitrogen atmosphere with an oxygen concentration of 100 ppm to obtain a release film having a polymer layer of thickness "t" formed on the base film. The thickness "t" was measured using a spectrophotometer (trade name: V-670 by JASCO Corp.). The ultraviolet irradiation was to a cumulative dose of 250 mJ/cm².

<Measurement of SRp and Water Contact Angle>

The maximum peak height (SRp) and water contact angle of the obtained release film were evaluated by the following procedure. The maximum peak height (SRp) of the polymer layer surface (release surface) was measured on the side opposite the base film side. The measurement was conducted according to JIS B0601, using a Micromap System (optical interference three-dimensional non-contact surface profile measurement system) by Ryoka Systems, Inc. The measurement results were as shown in Table 1.

Next, purified water was dropped onto the release surface of the polymer layer at room temperature (20° C.), and the purified water contact angle of the release surface was measured. The measurement results were as shown in Table 1.

<Preparation of Dielectric Material Slurry 1>

There were prepared a BaTiO₃-based ceramic powder, polyvinyl butyral (PVB) as an organic binder and methanol as a solvent. Next, 10 parts by mass of the organic binder and 130 parts by mass of the solvent were kneaded with 100 parts by mass of the ceramic powder using a ball mill, to form a slurry to obtain dielectric material slurry 1.

<Preparation of Dielectric Material Slurry 2>

There were prepared a BaTiO₃-based ceramic powder, polyvinyl butyral (PVB) as an organic binder and methanol as a solvent. Next, 10 parts by mass of the organic binder and 165 parts by mass of the solvent were kneaded with 100 parts by mass of the ceramic powder using a ball mill, to form a slurry to obtain dielectric material slurry 2.

<Evaluation of Release Properties and Repelling Property>

On the polymer layer of the release film formed in the manner described above there were applied the prepared dielectric material slurries 1 and 2 to prescribed thicknesses across a length of 20 m respectively, by doctor blading, and the repelling property was evaluated. The 20 m length of release film was visually examined, and there was assigned an evaluation of "C" when repelling of the dielectric material slurry occurred on the polymer layer surface generating multiple pinholes, "B" when one pinhole was generated, and "A" when no pinholes were generated. The evaluation was carried out visually. The evaluation results are shown in Table 1.

The applied dielectric material slurries 1 and 2 were dried to form a dielectric material green sheet with a thickness of 1 μm on the polymer layer of the release film. The release film was then released from the dielectric material green sheet and the presence of release residue was evaluated. There was assigned an evaluation of "C" when the dielectric material green sheet remained on the polymer layer, "B" when a slight portion of the dielectric material green sheet remained on the polymer layer, and "A" when no dielectric material green sheet remained on the polymer layer. The evaluation was carried out visually. The evaluation results are shown in Table 1.

Examples 2-7

A release film was formed and evaluated in the same manner as Example 1, except that the mixing proportion of the modified silicone oil was changed as shown in Table 1. The evaluation results are shown in Table 1.

Example 8

A release film was formed and evaluated in the same manner as Example 3, except that a vinyl group-modified silicone oil represented by the following formula (7) (specific gravity: 0.98) was used instead of the acryloyl group-modified silicone oil (specific gravity: 0.98). The evaluation results are shown in Table 1.

(7)

Example 9

A release film was formed and evaluated in the same manner as Example 3, except that an acrylate monomer represented by the following formula (8) (specific gravity: 0.98) was used instead of the acrylate monomer of Example 3. The evaluation results are shown in Table 1.

(8)

Comparative Example 1

A release film was formed and evaluated in the same manner as Example 1, except that unmodified silicone oil was used instead of modified silicone oil. The evaluation results are shown in Table 1.

Comparative Example 2

A release film was formed and evaluated in the same manner as Example 4, except that unmodified silicone oil was used instead of modified silicone oil. The evaluation results are shown in Table 1.

Comparative Example 3

A release film was formed and evaluated in the same manner as Example 4, except that hydroxyl-modified silicone oil (reactive group: OH) was used instead of the acryloyl group-modified silicone oil. The evaluation results are shown in Table 1.

Comparative Example 4

A platinum catalyst was added to a mixture of vinyl group-containing methylvinylpolysiloxane and methylhydrogensilane for addition reaction to prepare a thermosetting-type silicone resin solution. The silicone resin solution was diluted with toluene to a solid concentration of 10 mass %, and then applied onto a biaxially stretched polyethylene terephthalate (PET) film (base film, thickness: 38 μm) with a bar coater to a dry coated film thickness of 1.8 μm. Drying and curing reaction were carried out for 40 seconds at a heating temperature of 110° C. to obtain a release film having a silicone resin layer (release layer) formed on the base film.

Examples 10-12

A release film was formed and evaluated in the same manner as Example 2, except that the amount of coating solution applied onto the base film was changed to alter the thickness "t" of the polymer layer formed on the base film as shown in Table 1.

Example 13

A release film was formed and evaluated in the same manner as Example 12, except that a biaxially stretched polyethylene terephthalate (PET) film with a thickness of 50 μm was used as the base film.

Example 14

A release film was formed and evaluated in the same manner as Example 12, except that a biaxially stretched polyethylene terephthalate (PET) film with a thickness of 75 μm was used as the base film.

Examples 15-20, Reference Example 1

A polymer layer was formed on a base film in the same manner as Example 3. Release films for Examples 15-20 were formed with different polymer layer thicknesses by changing the amount of coating solution applied onto the base film. The thicknesses of the polymer layers measured in the same manner as Example 1 are shown in Table 2.

The maximum peak heights (SRp) of the release surfaces on the formed release films were also measured. The measurement was conducted according to HS B0601, using a Micromap System (optical interference three-dimensional non-contact surface profile measurement system) by Ryoka Systems, Inc. The measurement results were as shown in Table 2. No release film was formed in Reference Example 1, and the SRp of the surface of the base film was measured. It was confirmed that a smooth surface is obtained if the thickness of the polymer layer is larger than the SRp of the surface of the base film.

Comparative Example 5

A release film was formed in the same manner as Example 1, except that modified silicone oil was not used. The polymer layer was separated and the mass was measured to determine the density of the polymer layer. The density was 1.1 g/cm$^3$, and the contact angle was 72°.

TABLE 1

| | Modified silicone oil mixing ratio b (mass %)*1 | Polymer layer thickness t (μm) | Contact angle (°) | Amount of silicone polymer component per unit area (mg/m$^2$)*2 | SRp (μm) | Dielectric slurry 1 Release residue | Dielectric slurry 1 Repelling property | Dielectric slurry 2 Release residue | Dielectric slurry 2 Repelling property |
|---|---|---|---|---|---|---|---|---|---|
| Example 1 | 0.01 | 1.8 | 82 | 0.20 | 0.05 | A | A | A | A |
| Example 2 | 0.02 | 1.8 | 89 | 0.40 | 0.05 | A | A | A | A |
| Example 3 | 0.05 | 1.8 | 99 | 0.99 | 0.05 | A | A | A | A |
| Example 4 | 0.1 | 1.8 | 103 | 2.0 | 0.05 | A | A | A | A |
| Example 5 | 0.2 | 1.8 | 104 | 4.0 | 0.05 | A | A | A | A |
| Example 6 | 0.3 | 1.8 | 104 | 5.9 | 0.05 | A | A | A | A |
| Example 7 | 0.4 | 1.8 | 104 | 7.9 | 0.05 | A | A | A | B |
| Example 8 | 0.05 | 1.8 | 94 | 0.99 | 0.05 | A | A | A | A |
| Example 9 | 0.05 | 1.8 | 99 | 0.99 | 0.05 | A | A | A | A |
| Comp. Ex. 1 | — | 1.8 | 80 | — | 0.05 | B | A | B | A |
| Comp. Ex. 2 | — | 1.8 | 100 | — | 0.05 | B | B | B | C |
| Comp. Ex. 3 | 0.1 | 1.8 | 101 | 2.0 | 0.05 | A | B | B | C |
| Comp. Ex. 4 | — | 1.8 | 109 | — | *3 | A | C | A | C |
| Example 10 | 0.02 | 0.9 | 82 | 0.20 | 0.08 | A | A | A | A |
| Example 11 | 0.02 | 2.7 | 94 | 0.59 | 0.05 | A | A | A | A |
| Example 12 | 0.02 | 3.6 | 97 | 0.79 | 0.05 | A | A | A | A |
| Example 13 | 0.02 | 3.6 | 97 | 0.79 | 0.05 | A | A | A | A |
| Example 14 | 0.02 | 3.6 | 97 | 0.79 | 0.05 | A | A | A | A |

*1 Mixing ratio of modified silicone oil with respect to total of acrylate monomer and modified silicone oil.
*2 Value calculated by the formula (10 × B × t × d), where d (g/cm$^3$) is the density of the polymer layer.
*3: Visually discernible irregularity.

TABLE 2

| | Polymer layer thickness (t) μm | SRp μm |
|---|---|---|
| Example 15 | 0.5 | 0.45 |
| Example 16 | 0.7 | 0.30 |
| Example 17 | 1.0 | 0.05 |
| Example 18 | 1.2 | 0.05 |
| Example 19 | 1.5 | 0.05 |
| Example 20 | 2.0 | 0.05 |
| Comp. Example 1 | 0.0 | 0.80 |

Example 7 was assigned a repellent property evaluation of "B", but the effect was minor for practical use. The release film was then used to fabricate a laminated ceramic capacitor as a type of ceramic part.

Example 21

A dielectric material slurry 1 was applied onto the release film formed in Example 4 to a post-firing dielectric layer thickness of 1.1 μm to form a dielectric material green sheet. Next, Ni paste was printed and dried onto the dielectric material green sheet to obtain a ceramic part sheet 20 with a green sheet 6 as shown in FIG. 2.

A laminated body 1 was formed by laminating 200 green sheets 20 each obtained by releasing a release film 10 from a ceramic part sheet 20. An external green sheet with no electrode layer formed thereon was laminated on the edge of the laminated body 1 perpendicular to the direction of lamination, to obtain a laminated body 2. The laminated body 2 was then cut to a prescribed size to obtain green chips. The green chips were subjected to binder removal treatment, firing and heat treatment, and then a terminal electrode was formed on the side of the obtained sintered compact to fabricate a laminated ceramic capacitor.

After fabricating 100 such laminated ceramic capacitors, the presence of shorts was investigated. As a result, only 3 of the 100 capacitors exhibited shorting.

Comparative Example 5

There were fabricated 100 laminated ceramic capacitors in the same manner as Example 21, except for using release films according to Comparative Example 4 instead of according to Example 4, and the presence of shorts was investigated. As a result, shorting was exhibited by all 100 of the capacitors.

Comparative Example 6

A platinum catalyst was added to a mixture of vinyl group-containing methylvinylpolysiloxane and methylhydrogensilane for addition reaction to prepare a thermosetting-type silicone resin solution. The silicone resin solution was diluted with toluene to a solid concentration of 1 mass %, and then applied onto a biaxially stretched polyethylene terephthalate (PET) film (base film, thickness: 38 μm) with a bar coater to a dry coated film thickness of 0.1 μm. Drying and curing reaction were carried out for 40 seconds at a heating temperature of 110° C. to obtain a release film having a silicone resin layer (release layer) formed on the base film. The SRp of the release film was 0.8 μm.

There were fabricated 100 laminated ceramic capacitors in the same manner as Example 21, except for using this release film instead of a release film fabricated as in Example 4, and the presence of shorts was investigated. As a result, 48 of the 100 capacitors exhibited shorting.

Based on the results of Example 21 and Comparative Examples 5 and 6, it was confirmed that using a smooth release film with a small SRp can inhibit shorting in a laminated ceramic capacitor. That is, the pinholes generated in the ceramic green sheet and occurrence of shorting in Comparative Example 5 were attributed to the poor surface smoothness and repelling property. Presumably, the cause of shorting in Comparative Example 6 was the narrow thickness of the dielectric layer at the peaks on the release film surface, due to the peaks. A laminated ceramic capacitor that exhibited shorting in Example 21 was examined. The shorting was found to be caused by a slight positional shift between the ceramic part sheets during lamination, and not by the material quality or properties of the release film.

What is claimed is:

1. A release film comprising a base film and a polymer layer on one side of the base film:
   wherein the polymer layer comprises a (meth)acrylate polymer component and a silicone polymer component, wherein the silicone polymer component is 0.001-10 parts by mass with respect to 100 parts by mass of the (meth)acrylate polymer component;
   wherein a part of a surface of the (meth)acrylate polymer component is covered by the silicone polymer component on the side opposite the base film;
   wherein the silicone polymer component is a modified silicone oil polymer that has been modified with a (meth)acryloyl and/or vinyl group; and
   wherein the polymer layer is formed by a process comprising:
   applying a coating solution onto the base film, wherein the coating solution comprises a photopolymerization initiator, an organic solvent, the (meth)acrylate polymer component, and the silicone oil to form a precursor layer, wherein the (meth)acrylate polymer component and the silicone oil are mutually immiscible; and
   irradiating, the precursor layer to form a polymer layer on the base film.

2. The release film according to claim 1, wherein a water contact angle is 82-104° on the surface opposite the base film side of the polymer layer.

3. The release film according to claim 1, which satisfies the following formula (1):

$$0.2 \leq 10 \times b \times t \times d \leq 6 \quad (1)$$

where,
   b (mass %) is a content of the silicone polymer component in the polymer layer,
   d (g/cm$^3$) is a density of the polymer layer, and
   t (μm) is a thickness of the polymer layer.

4. The release film according to claim 1, wherein a thickness t (μm) of the polymer layer is 0.5-3 μm.

5. The release film according to claim 1, wherein a thickness of the polymer layer t (μm) is greater than a maximum peak height on the surface of the base film in contact with the polymer layer.

6. A ceramic part sheet comprising the release film according to claim 1, and a green sheet composed of a ceramic green sheet and/or an electrode green sheet on the polymer layer of the release film.

7. A ceramic part sheet comprising the release film according to claim 2, and a green sheet composed of a ceramic green sheet and/or an electrode green sheet on the polymer layer of the release film.

8. A ceramic part sheet comprising the release film according to claim 3, and a green sheet composed of a ceramic green sheet and/or an electrode green sheet on the polymer layer of the release film.

* * * * *